United States Patent [19]

Nixon

[11] Patent Number: 5,131,429
[45] Date of Patent: Jul. 21, 1992

[54] FLUID INJECTOR ASSEMBLY

[75] Inventor: Terence W. Nixon, Tewksbury, Mass.

[73] Assignee: Janis Research Company, Inc., Wilmington, Mass.

[21] Appl. No.: 745,430

[22] Filed: Aug. 15, 1991

[51] Int. Cl.⁵ .................. F16K 51/00; F17C 13/00
[52] U.S. Cl. .................. 137/614.2; 251/149.7; 62/50.7; 137/329.3
[58] Field of Search .......... 141/349; 62/50.7; 251/149.7, 149.6; 137/614.2, 329.1, 329.2, 329.3

[56] References Cited

U.S. PATENT DOCUMENTS

| 924,207 | 6/1909 | Wilson | 137/329.3 |
| 2,684,805 | 7/1954 | McBean | |
| 2,905,487 | 9/1959 | Schifter | 137/329.1 |
| 2,925,103 | 2/1960 | Kerr et al. | 141/349 |
| 3,003,325 | 10/1961 | Poethig et al | 62/50.7 |
| 3,181,737 | 5/1965 | Chaucer | |
| 3,293,877 | 12/1966 | Barnes | 62/50.7 |
| 3,513,887 | 5/1970 | Limandri | |
| 3,556,171 | 1/1971 | Gangwisch | |
| 3,794,289 | 2/1974 | Taylor | 251/149.7 |
| 4,354,523 | 10/1982 | Hochmuth et al. | 137/614.2 |
| 4,699,356 | 10/1987 | Hargrove et al. | 251/149.6 |

FOREIGN PATENT DOCUMENTS

| 1457578 | 7/1970 | Fed. Rep. of Germany | 251/149.7 |
| 2628820 | 9/1989 | France | 251/149.6 |

Primary Examiner—A. Michael Chambers
Attorney, Agent, or Firm—Cesari and McKenna

[57] ABSTRACT

A quick disconnect fluid injection assembly for delivering a cryogenic fluid into a container is disclosed. A passage, having an entrance and an exit, provides access to the inside of the container. A pre-valve adjacent to the entrance blocks the passage to exclude dirt and debris and a fluid check valve adjacent to the exit prevents backflow of fluid from the container through the passage. In use, an elongated injector is inserted into the passage. The injector first opens the pre-valve and then the fluid check valve and thereafter injects cryogenic fluid through the check valve into the container.

17 Claims, 2 Drawing Sheets

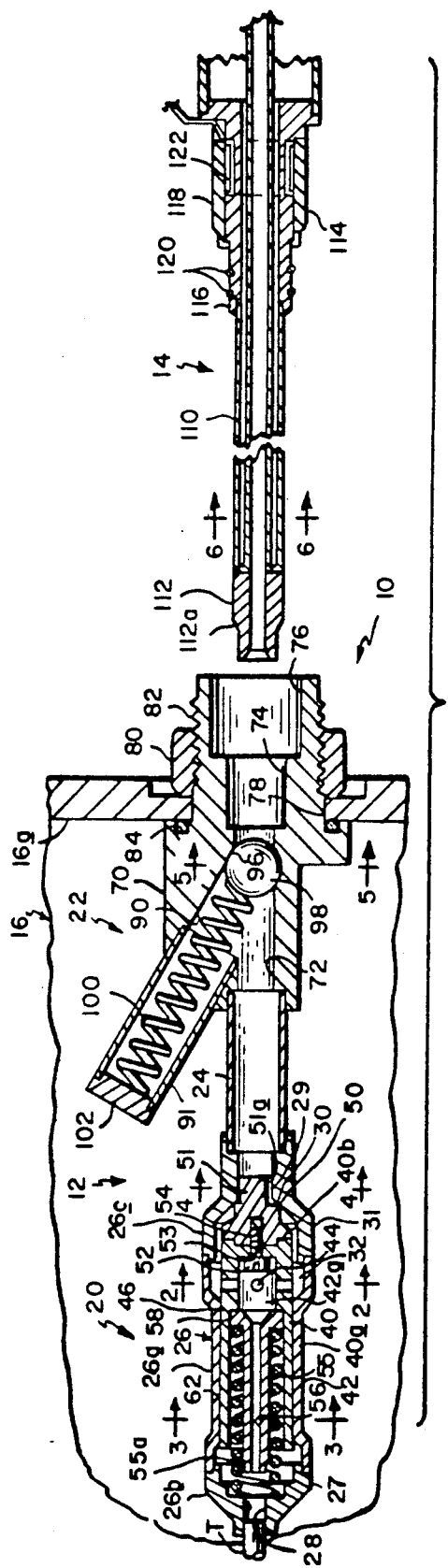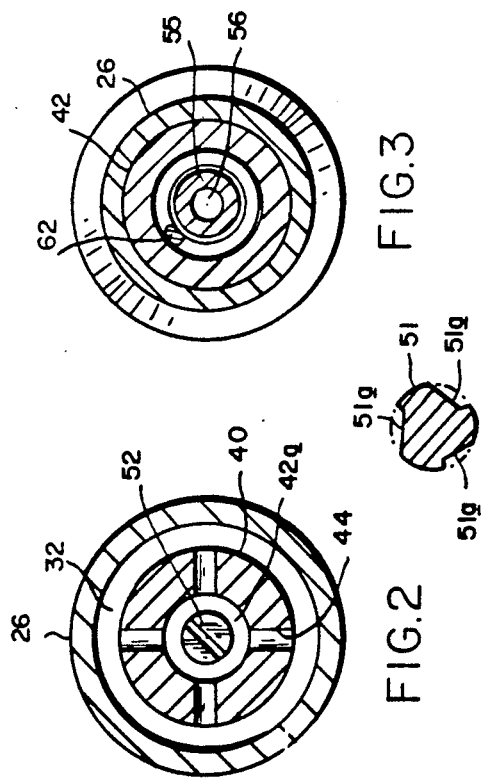

FLUID INJECTOR ASSEMBLY

FIELD OF THE INVENTION

This invention relates generally to quick disconnect fluid fittings and more specifically to a fluid injector assembly used to deliver a cryogenic fluid into a container.

BACKGROUND OF THE INVENTION

Cryogenic fluids, e.g. liquid helium, are often used as refrigerants. For example, they may be used to cool certain missile subsystems, such as telescopes and infrared detection apparatus. In this application, the liquid is injected through a valve into a tank inside the missile just before firing. Since missiles are typically used in dangerous, life-threatening situations which require a swift and accurate response, it is imperative that the liquid charging process be speedy and exact. Additionally, to ensure the missile's proper operation, it is important to prevent contaminants from entering the system.

The general concept of pushing a male bayonet-type injector member against a spring-biased valve member for filling purposes is not new. However, prior injector or valve mechanisms employing this principle are not well-suited for missile and similar applications. They are either too cumbersome or have a complex locking system, either of which can slow down the filling process. Also, conventional such valves do not have mechanisms for preventing contaminants, such as dust or insects, from entering the valves and interfering with the proper operation of the valves and/or contaminating the liquid flowing through the valves. Additionally, in some prior valves, not enough attention has been paid to minimizing turbulent flow of the cryogenic liquid with the result that excessive evaporation of the liquid occurs in those valves.

SUMMARY OF THE INVENTION

It is among the objects of this invention to provide a bayonet-type injector assembly which quickly and safely delivers a cryogenic fluid, such as liquid helium, into a vessel.

Another object of the invention is to provide an assembly such as this which minimizes contamination of the injected liquid.

A further object of this invention is to provide an injector assembly which allows efficient injection of a cryogenic fluid into a container therefore.

Still another object of this invention is to provide an assembly of this general type which is reliable and long lived.

Briefly, the assembly incorporates a bayonet injector for delivering a cryogenic fluid into a vessel via a valve assembly mounted to the vessel wall which defines a fluid injection pathway. The valve assembly includes a main check valve and a pre-valve positioned at opposite ends of that passage. The main check valve has a valve member which is spring-biased to a normally closed position against its seat and is opened by the bayonet injector when the injector is inserted fully into the valve assembly. Preferably, the valve is designed to encourage nonturbulent flow of liquid through the valve when the valve is open to minimize evaporation losses.

The pre-valve is positioned in the fluid passage upstream from the main valve and includes a ball-type valve member which is spring-biased to a normally closed position against its seat so that it blocks the passage. The pre-valve is pushed opened by the injector when the injector is inserted into the valve assembly to inject fluid through the main valve into the vessel. Thus, the pre-valve keeps contaminants away from the main valve, preventing them from being entrained in the injected fluid and/or interfering with the proper operation of the main valve.

BRIEF DESCRIPTION OF THE DRAWINGS

The above and further objects of the invention may be better understood by referring to the following description in conjunction with the accompanying drawings, in which:

FIG. 1 is a sectional view with certain parts shown in elevation of an injector assembly incorporating the invention;

FIG. 2 is a sectional view taken along line 2—2 of 1;

FIG. 3 is a sectional view taken along line 3—3 of FIG. 1;

FIG. 4 is a sectional view taken along line 4—4 of FIG. 1;

FIG. 5 is a sectional view taken along line 5—5 of FIG. 1;

FIG. 6 is a sectional view taken along line 6—6 of FIG. 1; and

DETAILED DESCRIPTION OF ILLUSTRATIVE EMBODIMENT

Figure 7:
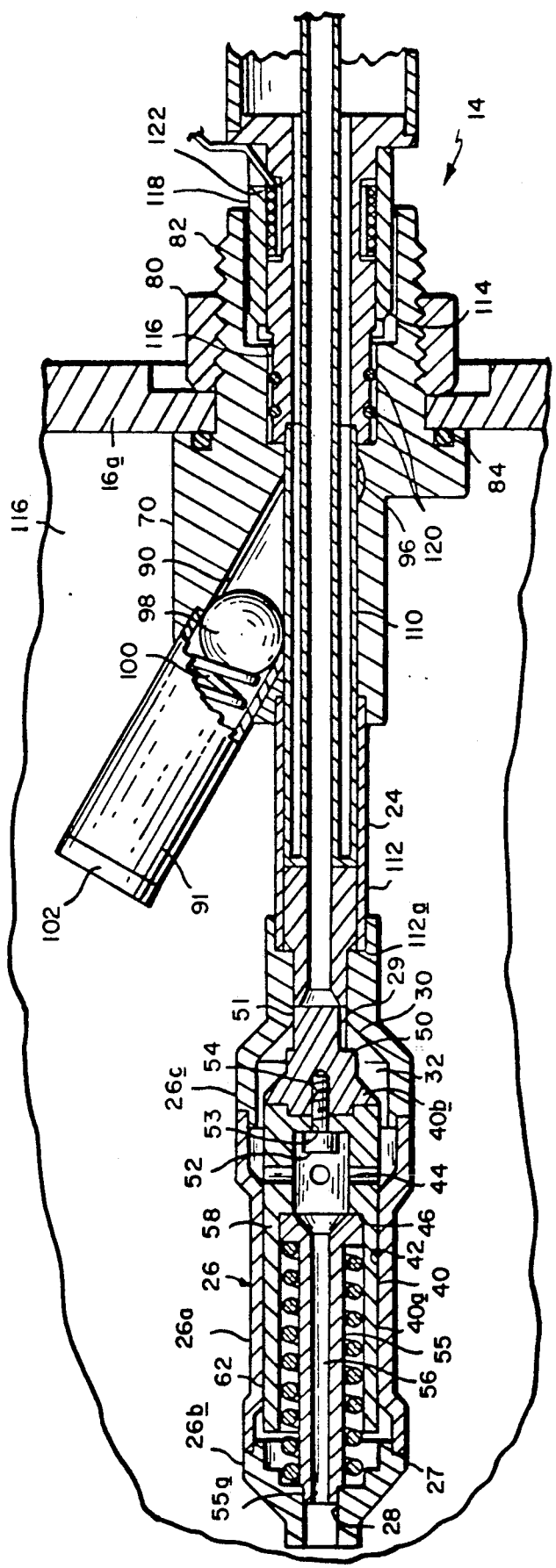
FIG. 7 is an elevational view similar to FIG. 1 showing the injector assembly during a filling operation.

Referring to FIG. 1 of the drawings, an injector assembly shown generally at 10 comprises a valve assembly 12 usually mounted in the outer wall 16a of a Dewar vessel 16 and an injector 14 which, when coupled to the valve assembly, may deliver a cryogenic fluid such as liquid helium into vessel 16. Actually, vessel 16 may be fitted with a second valve assembly 12 to vent the vessel as it is being filled by way of the first assembly 12.

The valve assembly 12 includes a main check valve 20 and a pre-valve 22 positioned at opposite ends of a tube 24. The main check valve 20 is typically closed to form a fluid-tight seal at the entrance to vessel 16, but opens under the force exerted by the injector 14 when the injector is pushed far enough into the valve assembly to protrude through pre-valve 22 and tube 24. When open, the main check valve 20 permits the cryogenic fluid released by the injector 14 to pass through the main check valve 20 and into the vessel 16.

The pre-valve 22 is normally closed to prevent contaminants from entering the valve assembly 12, but opens when pushed by the injector 14, allowing the injector 14 to pass through the pre-valve and open the main check valve 20.

Once the injection process is complete, the injector 14 may be retracted from the valve assembly 12, allowing the main check valve 20 and pre-valve 22 to return to their closed positions.

As viewed in FIG. 1, the main check valve 20 has a valve housing 26, preferably made of stainless steel, and comprised of three sections, namely: a main section 26a, a left end cap 26b, and a right end cap 26c. The main section 26a is basically a hollow cylinder with flared ends. The left end cap 26b has a cylindrical skirt 27 whose free edge is notched to interfit with the left end of the main section 26a. An axial passage 28 is formed in end cap 26b which constitutes the outlet of valve assembly 12 as a whole. In use, passage 28 communicates with a tube T which conducts the cryogenic fluid through the inner wall of the Dewar container to the interior of vessel 16. A vacuum is maintained in the space between the two walls of the vessel for insulation purposes. The right end cap 26c has an axial passage 29 which is necked down to define an internal frustoconical valve seat 30. The entrance to passage 29 constitutes the inlet of main check valve 20. The smaller end of end cap 26c telescopes onto tube 24. The larger end of that cap defines a cylindrical skirt 31 whose free edge is notched to interfit with the right end of the housing main section 26a. Normally, the end caps 26b and 26c are welded all around to main section 26a so that housing 26 defines a hollow fluid-tight valve chamber 32. Likewise, the tube 24 is welded to the housing end cap 26c so there is no fluid leakage at the boundary between those two members.

As viewed in FIG. 1, a valve member 40 is inserted into valve housing 26 from the left prior to attaching end cap 26b to the housing, and is axially movable inside the valve chamber 32. The valve member 40, also preferably made of stainless steel, is comprised of a first valve member section 40a and a second valve member section 40b. As best seen in FIGS. 1 to 3, the first section 40a is a cylinder with an axial bore 42 extending in from the left hand end partway along the cylinder. Bore 42 has a reduced diameter segment 42a at the right hand end of section 40a and section 40a is formed with a circular array of radial holes 44 that intercept that bore segment 42a. Thus, bore 42 enlarges to the left of the holes 44, as viewed in FIG. 1, to define a ledge 46.

As shown in FIGS. 1 and 4, valve member section 40b is positioned against the closed or right hand end of the valve member section 40a. Section 40b is generally cylindrical, but stepped to define a shoulder 50 which is arranged to seat against the conical valve seat 30. The diameter of the second valve member section 40b narrows at shoulder 50 to form a cylindrical tip 51 which protrudes snugly but slidably into the passage 29 through right end cap 26c. Tip 51 has longitudinal notches or grooves 51a at its periphery so that fluid can flow easily by the tip 51 into valve chamber 32 when valve member 40 is in its open position. The second valve member section 40b is fastened to the first section 40a by a threaded fastener 52 inserted through an axial hole 53 in the right hand end of first valve member section 40a and turned down into an axial threaded passage 54 in the second valve member section 40b.

A tubular stem 55, of aluminum or the like metal, is seated in the valve member bore 42. The stem is formed with a cylindrical flange 58 at its right hand end which seats tightly against ledge 46, as will be described, so that the stem is aligned with the longitudinal axis of main check valve 20. An axial passage 56 extends the entire length of stem 55 and flares out at flange 58 to substantially the same diameter as bore segment 42a. A left end segment of stem 55 projects from the mouth of bore 42 and the free end 55a of that segment has a reduced outer diameter. Normally, i.e. when valve 20 is closed, that end 55a is spaced axially from end cap 26b as shown in FIG. 1.

A spring 62 encircles stem 55 with one end seating against stem flange 58, the stem thus centralizing the spring in bore 42. The opposite end of the spring is engaged by the left end cap 26b of housing 26 so that the spring is compressed and normally exerts a force of about 200 lbs. against stem flange 58 which urges the shoulder 50 of valve member 40 against the valve seat 30 to create a fluid-tight seal there. The shoulder 50 creates a rather sharply defined circular seating line to minimize the contact area between the valve member and valve seat. Otherwise, an even stronger spring would be required to maintain the valve member in its closed position under the prevailing pressure, e.g. 45 psi, of the super critical liquid, e.g. helium, inside vessel 16. The spring also presses the stem flange 58 tightly against ledge 46 in bore 42 so that substantially no fluid can flow between the flange and the ledge.

When valve member 40 is unseated from seat 30, fluid from tube 24, e.g. liquid helium released by injector 14, can flow through passage 29 in end cap 26c into valve chamber 32. From there, the fluid passes through the holes 44 in valve member section 40a into the bore segment 42a. Thence, the fluid flows along passage 56 in stem 55, whose end 55a now engages passage 28 (See FIG. 7), and exits the valve through the passage 28 in the left hand end cap 26b. Thus, when the main valve 20 is open, the cryogenic liquid is constrained to flow in a non-turbulent fashion along the stem bore 56 to the outlet of the valve so that heating of the liquid and attendant evaporation thereof are kept to a minimum.

Referring to FIGS. 1 and 5, the pre-valve 22 comprises a valve housing 70 which defines an axial passage 72. The outer or right hand end segment of passage 72 is counterbored at 74 and again at 76 to form a stepped pathway. The left end of housing 70 is telescoped onto, and welded to, the right end of tube 24 so that the housing passage 72 and the tube 24 are in axial alignment. The housing 70 has a reduced diameter outer neck 82 which is threaded and received in a hole 78 in the wall 16a of vessel 16. It is held in place there by a threaded collar 80 which is turned down on neck 82. An O-ring seal 84 recessed into the end of housing 70 assures a vacuum-tight connection between the valve housing 70 and the vessel wall 16a.

Housing 70 is formed with a branch passage 90 which intercepts passage 72 at an angle of about 135°. The outer end segment of passage 90 is counterbored to accept one end of a cylindrical tube 91 which is welded to the housing.

Present just beyond the intersection of passages 72 and 90 inside housing 70 is a generally conical valve seat 96 and a spherical valve member 98, e.g. of nylon, is arranged to seat on seat 96. The valve member 98 is biased against seat 96 by a coil spring 100 extending along branch passage 90 and tube 91 and compressed between member 98 and a plug 102 that closes the outer end of tube 91. Thus, valve member 98 normally closes passage 72 in pre-valve 22 so that dirt and other contaminants cannot pass through the pre-valve to tube 24 and to the main valve 20 beyond. However, when a leftward force is applied to valve member 98, that member retracts away from the valve seat 96 into the branch passage 90 so that the bayonet-type injector 14 can bypass valve member 98 and proceed to the main check valve 20. Preferably, the diameters of branch passage 90 and valve member 98 are appreciably larger than the diameter of passage 72 so that the valve member, when unseated, assuredly retracts into branch passage 90.

As shown in FIGS. 1 and 6, the injector 14 component of assembly 10 comprises an elongated tube 110 having a tubular tip 112 and a tubular head 114 at opposite ends. The tube 110 is comprised of coaxial tubing to provide a vacuum insulating space between the two tubes to minimize evaporation of cryogenic fluid flowing through the injector. The tube 110 is sized to slide along passage 72 of pre-valve 22 and through tube 24 and an end segment 112a of tip 112 is necked down to slidably fit in the entrance passage 29 of main check valve 20.

The injector head 114 is stepped in diameter to define cylindrical surfaces 116 and 118 that fit snugly in counterbores 74 and 76, respectively, of pre-valve housing 70. In the illustrated injector, surface 116 has O-rings 120 encircling it which can create gas-tight seals between surface 116 and the wall of counterbore 74 when injector 14 is fully inserted into valve assembly 12. If desired, injector 14 may also have a built-in electric heater 122 underlying its surface 118 which, when energized, would prevent injector 14 from freezing up in valve assembly 12 during the fluid injection process.

In use, the main check valve 20 and the pre-valve 22 are normally closed. The main check valve thus forms a fluid-tight seal which prevents leakage of fluid from the vessel 16. The pre-valve 22, on the other hand, ensures that dirt and debris will not enter valve assembly 12 and interfere with the operation of the main check valve 20 or enter vessel 16.

As shown in FIG. 7, to inject cryogenic fluid into the vessel 16, the injector 14 is inserted fully into the valve assembly 12. As the injector tip 112 passes through the pre-valve housing 70, it engages spherical valve member 98 therein and pushes that member 98 inward and upward into branch passage 90 against the opposition of spring 100 so that the injector 14 can bypass member 98.

After passing through the pre-valve 22 thusly, the injector penetrates tube 24 to the main check valve 20. As soon as the injector tip 112 enters the passage 29 in right end cap 26c of valve housing 26 and engages tip 51 of valve member 40, the injector 14 unseats valve member 40 from valve seat 30 against the bias of spring 62. Fluid may then be flowed through the injector 14 which thereupon injects the fluid into the main check valve 20. That fluid enters valve chamber 32 of the main check valve 20 and flows through holes 44 in valve member 42 and along the stem passage 56, leaving valve assembly 12 through the outlet passage 28 in left end cap 26b. During filling, if needed, the heater 122 may be energized from an electrical source (not shown) so that the injector head 114 stays warm and does not freeze and/or stick to the pre-valve housing 70.

After the injection process is completed, the flow of fluid through injector 14 is stopped and the injector 14 is withdrawn from valve assembly 12. As soon as the injector 14 disengages from tip 51 of valve member 40, valve member 40 seats against its seat 30 thereby sealing vessel 16. Then, when the injector is retracted from pre-valve housing 70, the valve member 98 seats on seat 96 thereby blocking the passage 72 to tube 24 and the main check valve 20.

The foregoing description has been limited to a specific embodiment of this invention. It will be apparent, however, that variations and modifications may be made to the invention, with the attainment of some or all of its advantages. Therefore, it is the object of the appended claims to cover all such variations and modifications as come within the true spirit and scope of the invention.

What is claimed is:

1. A fluid injection assembly comprising a valve assembly including
    means defining a fluid passage having an entrance end and an exit end,
    a fluid check valve adjacent to the passage exit end for preventing fluid backflow through said passage, and
    passage blocking means including
        a valve member adjacent to the entrance end of said passage, said valve member being movable between a closed position wherein said valve member blocks said passage and an open position wherein said valve member is substantially clear of said passage, and
        means for biasing the valve member to its closed position so that when an elongated fluid injector is inserted into said passage through the entrance end thereof to engage said check valve, the injector will move said valve member to its open position and bypass said passage blocking means before engaging the check valve.

2. The assembly defined in claim 1 wherein said entrance end and said exit end define a straight axis, and said fluid check valve comprises:
    a valve housing having an inlet and an outlet and a valve seat in between, said inlet being aligned with said axis;
    a second valve member in said housing, said second valve member having at least a portion aligned with said axis and being movable between a closed position against said valve seat to provide a seal and an open position wherein said second valve member is unseated from said valve seat allowing fluid to flow from said inlet to said outlet; and
    means in said housing for biasing the second valve member to its closed position, whereby said second valve member can be engaged and unseated by a fluid injector inserted along said axis through said housing inlet.

3. The assembly as defined in claim 2 wherein said biasing means comprise a spring compressed between said second valve member and said housing.

4. The assembly as defined in claim 2 wherein said second valve member is generally cylindrical with a longitudinal axis aligned with said axis, said second valve member having an axial bore extending from its end remote from said valve seat and said second valve member having a circular array of radial openings so that fluid can pass from the exterior of said second valve member into said bore, and said second valve member further including a tubular stem having a flanged end in said bore and an opposite end, said stem being positioned in said bore to conduct fluid in said bore to said valve housing outlet.

5. The assembly defined in claim 4 wherein the length of said stem is selected so that when said second valve member is in said closed position, the opposite end of the stem is spaced from said outlet and when the second valve member is in its open position, said stem opposite end is contiguous to said outlet.

6. The assembly as defined in claim 5 wherein said biasing means comprise a spring encircling said tubular stem and compressed between said housing and said stem flanged end, said spring thereby being substantially centralized in said bore to conduct fluid in a nonturbulent fashion through said fluid check valve when said second valve member is in its open position.

7. The assembly defined in claim 1 wherein at least a portion of said passage defines a valve seat, and said valve member is a spherical valve member which in its closed position seats on said valve seat.

8. The assembly as defined in claim 7 wherein said passage blocking comprises means defining a branch passage intercepting said fluid passage at a selected angle, said branch passage housing said biasing means and said spherical valve member when said sperhical valve member is in its open position.

9. The assembly defined in claim 8 wherein said selected angle is between 110° and 160°.

10. The assembly defined in claim 1 and further including a fluid injector, said injector including a tubular stem, said stem being sized to slidably fit in said passage through the entrance end thereof and being longer than the distance between said check valve and said blocking means so that the injector can engage and open the check valve.

11. The assembly defined in claim 10 wherein said tubular stem includes:
 a tubular tip at one end of said stem for engaging and unseating said valve member and engaging and unseating said check valve member;
 a tubular head at the other end of said stem, said head being snugly insertable within said passage entrance end; and
 means for injecting fluid from said injector.

12. The assembly defined in claim 10 wherein said injector stem is comprised of coaxial tubing.

13. The assembly defined in claim 11 and further including at least one O-ring surrounding said tube head for creating a vacuum-tight seal between said tube head and the wall of said passage entrance end.

14. The assembly defined in claim 10 wherein said injector also includes heating means so that said injector does not adhere to said blocking means when said injector is inserted into said passage and fluid is injected through said injector.

15. The assembly defined in claim 11 and further including an electric heater built in to said stem head.

16. An injection assembly, comprising:
 a valve assembly including
  means defining an axial fluid passage having an entrance end, an exit end and a longitudinal axis therebetween;
  valve means in said passage defining means proximate to the exit end of said passage, said valve means including
   means defining a valve seat in said passage, a valve member positioned in said passage between the valve seat and the passage exit end and movable along said passage between a closed position wherein said valve member seats on and provides a fluid tight seal with said valve seat and an open position wherein said valve member is spaced from said valve seat, and means for biasing said valve member toward its closed position; and
  passage blocking means located along said passage defining means between the passage entrance end and said valve means, said blocking means including
   means defining a seat, said seat having at least a portion thereof located in said passage,
   a passage blocking member movable along a second axis disposed at a selected angle to said passage axis between a closed position wherein said blocking member seats on said seat blocking said passage, and
   an open position wherein said blocking member is substantially removed from said passage; and
 elongated tubular fluid injection means for insertion into said passage, said injection means having a head for connection to a fluid source and a tip, said injector means, upon being inserted in said passage, being arranged and adapted to move said blocking member to its open position so that said injection means tip can push past said blocking member and engage and unseat the valve member.

17. The injection assembly defined in claim 16 wherein said selected angle is between 110° and 160°.

* * * * *